Dec. 19, 1967 S. MALINOWSKI ET AL 3,359,512

BAND PASS CRYSTAL FILTER CIRCUIT WITH SHARP CUTOFF

Filed Dec. 6, 1963

INVENTORS
Stanley Malinowski &
Corwin E. Livenick.
Mueller & Aichele
Attys.

United States Patent Office 3,359,512

Patented Dec. 19, 1967

3,359,512

BAND PASS CRYSTAL FILTER CIRCUIT WITH SHARP CUTOFF

Stanley Malinowski, Park Ridge, and Corwin E. Livenick, Hickory Hills, Ill., assignors to Motorola, Inc., Chicago, Ill., a corporation of Illinois Filed Dec. 6, 1963, Ser. No. 328,531
6 Claims. (Cl. 333—72)

ABSTRACT OF THE DISCLOSURE

Crystal filter circuit having first and second branches extending from input terminal to ends of an inductor having a grounded center tap. A variable capacitor is connected across the inductor. The first branch has one crystal establishing the lower frequency of the filter pass band and the second branch has crystal establishing the upper frequency of the pass band. Each branch has a crystal tuned to a predetermined frequency outside the filter pass band for attenuating signals adjacent one side of the pass band. Each branch may have two crystals tuned on the opposite sides of the pass band to attenuate signals on both sides of the pass band to provide a very sharp symmetrical response characteristic.

This invention relates generally to crystal circuits and more particularly to a band pass crystal filter circuit having a response characteristic with extremely steep sides.

Piezo-electric crystals have been used in filter circuits to provide a characteristic with steep sides to thereby provide sharp selectivity. It is known to use two crystals in a circuit to define a given band pass characteristic. Crystal filters have also included additional crystals to broaden the characteristics or to attenuate specific frequencies. However, when using additional crystals to attenuate particular frequencies, the resulting characteristic may be irregular with sharp, narrow return lobes. In some cases the pass band has been deteriorated, and the crystal filter has been difficult to adjust and align for quantity production.

It is therefore an object of the present invention to provide an improved crystal filter having a band pass response characteristic with steep sides.

A further object of the invention is to provide a crystal filter having characteristics such that it can be easily adjusted and aligned to thereby facilitate quantity production.

Another object of the invention is to provide a band pass filter having two crystals defining the band pass characteristics and additional crystals for attenuating frequencies adjacent the band pass.

A feature of the invention is the provision of a crystal filter circuit including first and second crystals which define the band pass of the filter, and at least one pair of additional crystals which are series resonant at the same frequency outside the band pass to balance out signals in a band including the series resonant frequency to thereby sharpen the sides of the filter characteristics.

Another feature of the invention is the provision of a band pass crystal filter circuit including first and second balanced branches each including one crystal which establishes the band pass, and first and second pairs of crystals with the crystals of each pair being in different branches and series resonant at the same frequency outside the band pass to balance out a band of frequencies adjacent to the band pass. The filter circuit therefore includes three crystals in each branch, with one crystal in each branch series resonant above the band pass and another crystal in each branch series resonant below the band pass.

Figure 1:
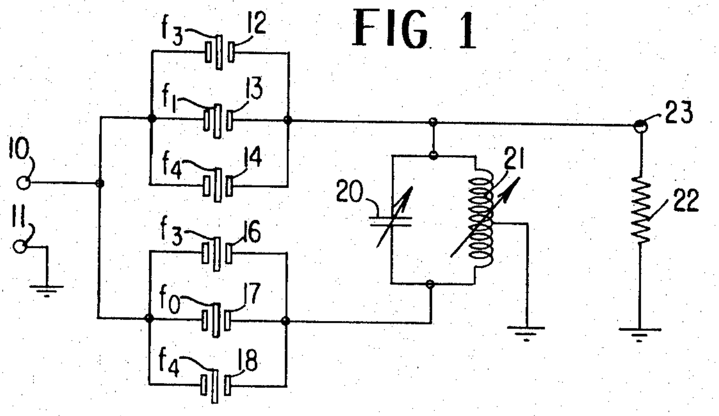
Figure 2:
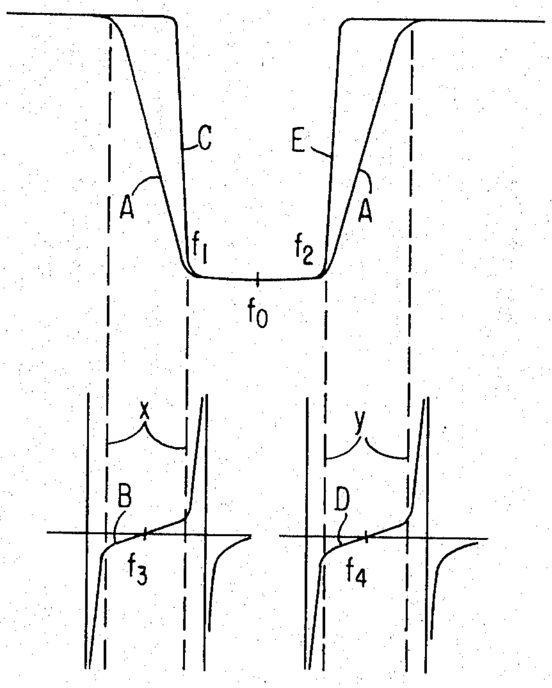

The invention is illustrated in the accompanying drawing wherein:

FIG. 1 is a circuit diagram of the crystal filter circuit in accordance with the invention; and FIG. 2 is a chart showing the response characteristics of the filter and the reactance frequency curves of the crystals which attenuate signals at the sides of the filter band pass.

In practicing the invention a crystal filter circuit is provided including first and second parallel branches. The branches are connected to a common input terminal and to the opposite ends of a parallel circuit including a variable capacitor and an inductor. The output is applied to a load from one of the branches. Each branch of the filter circuit includes one crystal which establishes the band pass, with the crystal in the first branch having a series resonant frequency to determine the lower frequency of the band pass and the crystal in the second branch having a series resonant frequency to determine the upper frequency of the band pass. Each branch of the circuit includes at least one crystal tuned to the same frequency outside the filter pass band as one crystal in the other branch. Each branch may include two crystals, one tuned below the lower frequency of the band pass and the other tuned above the higher frequency of the band pass. The crystals in the two branches which are tuned to the same frequency balance out signals extending on either side of the series resonant frequency thereof and this acts to sharpen the response characteristic of the band pass filter.

Referring now to the drawing, in FIG. 1 there is shown a crystal filter circuit including input terminals 10 and 11 to which signals may be applied. The circuit has a first branch in which crystals 12, 13 and 14 are connected in parallel, and a second branch in which crystals 16, 17 and 18 are connected in parallel. The two branches of the circuit are connected to opposite ends of the parallel circuit including variable capacitor 20 and inductor 21. Inductor 21 may also be variable and includes a center tap connected to a reference potential, shown as ground. A load resistor 22 is shown connected to the output of the filter, being connected between terminal 23 in circuit with the upper branch of the filter circuit and the reference potential.

In FIG. 2 the curve A shows the response curve of a crystal filter wherein $F_0$ is the center frequency and $F_1$ and $F_2$ define the lower and upper frequency edges of the pass band, respectively. This curve may be provided by a filter circuit having two branches as shown in FIG. 1, and having only crystal 13 in the first branch and crystal 17 in the second branch. The crystal 13 is series resonant at frequency $F_1$, thereby determining the lower frequency defining one side of the band pass of the filter. The crystal 17 determines the frequency $F_2$ which defines the upper frequency of the band pass. The two crystals 13 and 17 connected in the circuit of FIG. 1, without the other crystals shown therein, would produce a band pass characteristic as shown generally by curve A.

Crystals 12 and 16, connected in parallel with crystals 13 and 17 respectively, are series resonant at the same frequency $F_3$, with this frequency being selected to be lower than the frequency $F_1$ defining the lower frequency side of the band pass. The crystals 12 and 16 therefore will pass frequencies in a band extending on either side of frequency $F_3$. The curve B of FIG. 2 represents the reactance-frequency curve of crystals 12 and 16, and the reactance is quite low in a band of frequencies defined by the dotted lines $x$ on either side of the frequency $F_3$. Because of the low reactance of crystals 12 and 16 in this frequency range, the greater part of the currents in the two branches of the circuit flows through the crystals 12 and 16. Over this frequency range signals passing through the two branches of the filter will be substantially equal and will balance each other out across capacitor 20 and inductor 21. Therefore, this band of frequencies is effectively removed from the output of the filter circuit. As shown in FIG. 2, the crystals 12 and 16 effectively remove the band of frequencies defined by dotted lines $x$, to increase the steepness of the lower frequency side of the band pass characteristic so that it is very steep as shown by line C.

The crystals 14 and 18 in the two branches of the crystal filter circuit are series resonant at the same frequency $F_4$, which is above the upper frequency $F_2$ of the band pass of the filter. The reactance-frequency curve of crystals 14 and 18 is shown by curve D in FIG. 2, and this is generally the same as curve B for crystals 12 and 16, except for the frequencies involved. The reactance of the crystals 14 and 18 will be very low near the series resonant frequency $F_4$ of the crystals, within the frequency band defined by the dotted lines $y$. Therefore signals in this band will flow through crystals 14 and 18 and cancel out to sharpen the upper side of the filter characteristics. The response therefore changes from line A to that shown by line E. By using the two pairs of crystals which are series resonant below and above the band pass of the filter, the response curve can be changed from that shown by curve A to the curve produced by the lines C and E.

Filters have been constructed in accordance with the invention in which the bandwidth at the 60 decibel attenuation points is only 1.1 to 1.5 times greater than the bandwidth at the 6 decibel attenuation points. In order to provide a response characteristic without undesired irregularities in the response curve, the frequencies $F_3$ and $F_4$, which are the series resonant points of the crystals which balance out signals at the sides of the band pass characteristic, must be properly related with respect to the frequencies $F_1$ and $F_2$ which are the limits of the band pass characteristics. The series resonant frequencies $F_3$ and $F_4$ should be spaced from the center frequency $F_0$ by 10 to 50% more than the spacing of the frequencies $F_1$ and $F_2$, which define the pass band, from the center frequency $F_0$.

As an example, crystal filter circuits have been constructed for operation at a center frequency of 1.75 megacycles and with a bandwidth of 3.5 kilocycles, or 1.75 kilocycles on each side of the center frequency. In these circuits, the series resonant frequencies of the balancing crystals are about 2.5 kilocycles on each side of the center frequency. These values are given only as an example of frequencies used in a particular case, and are not to be considered to limit the values which may be used.

The crystal filter of the invention not only provides a response in which the pass band has steeper sides, but the response curve is free of undesired irregularities over the pass band, and at the edges of the pass band. The invention can be used to provide a filter response which is steep on only one side, or which is steep on both sides. Objectionable return lobes, both adjacent the pass band and removed from the pass band, are eliminated. Further, the filters present no difficulty in alignment or adjustment so that they may be constructed by mass production techniques.

We claim:

1. A crystal filter of the band pass type for selecting signals applied between an input terminal and a common terminal and providing an output signal between an output terminal and the common terminal, such filter including in combination, inductor means having first and second end terminals and an intermediate point connected to the common terminal, variable capacitor means connected in parallel across said inductor means, a first branch circuit including first, second and third crystals connected in parallel between said input terminal and said first end terminal, a second branch circuit including fourth, fifth and sixth crystals connected in parallel between said input terminal and said second end terminal, said first crystal being series resonant at a frequency to determine the lower frequency of the pass band of the filter and said fourth crystal being series resonant at a frequency to determine the upper frequency of the pass band of the filter, said first and fourth crystals determining the limits of the filter pass band, said second and fifth crystals being series resonant at a first frequency below the lower limit of the filter pass band, said third and sixth crystals being series resonant at a second frequency above the upper limit of the filter pass band, said second, third, fifth and sixth crystals acting to attenuate signals in frequency bands including said first and second frequencies and adjacent the pass band of the filter, and means connecting one of said first and second end terminals to the output terminal.

2. A crystal filter in accordance with claim 1 wherein said first and second frequencies are spaced from the center frequency of the pass band of the filter by an amount of the order of 10 to 50% greater than the spacing of the upper and lower frequencies of the pass band from the center frequency thereof.

3. A crystal filter of the band pass type for selecting signals applied between an input terminal and a common terminal and for providing an output signal between an output terminal and the common terminal, such filter including in combination, inductor means having first and second end terminals and an intermediate point connected to the common terminal, variable capacitor means connected in parallel across said inductor means, a first branch circuit including first and second crystals connected in parallel between said input terminal and said first end terminal, a second branch circuit including third and fourth crystals connected in parallel between said input terminal and said second end terminal, said first crystal being series resonant at a frequency to determine the lower frequency of the pass band of the filter and said third crystal being series resonant at a frequency to determine the upper frequency of the pass band of the filter, said first and third crystals determining the limits of the filter pass band, said second and fourth crystals being series resonant at a predetermined frequency outside the filter pass band and acting to attenuate signals in a frequency band including said predetermined frequency and adjacent the pass band of the filter, and means connecting one of said first and second end terminals to the output terminal.

4. A crystal filter in accordance with claim 3 wherein said predetermined frequency is above said upper frequency of the pass band of the filter.

5. A crystal filter in accordance with claim 3 wherein said predetermined frequency is below said lower frequency of the pass band of the filter.

6. A crystal filter in accordance with claim 3 wherein said predetermined frequency is spaced from the center frequency of the pass band of the filter by an amount of the order of 10 to 50% greater than the spacing of the upper and lower frequencies of the pass band from the center frequency thereof.

No references cited.

ROY LAKE, *Primary Examiner.*

DARWIN R. HOSTETTER, *Examiner.*